United States Patent Office 3,549,565
Patented Dec. 22, 1970

3,549,565
PROCESS OF CROSSLINKING DIMERCAPTO COMPOUNDS WITH POLYMERCAPTO POLYESTER POLYETHERS AND RESULTING PRODUCT
Faber B. Jones and Billy D. Simpson, Bartlesville, Okla., assignors to Phillips Petroleum Company, a corporation of Delaware
No Drawing. Original application Jan. 20, 1967, Ser. No. 610,491. Divided and this application Apr. 9, 1969, Ser. No. 814,816
Int. Cl. C08g 41/04
U.S. Cl. 260—7.5
6 Claims

ABSTRACT OF THE DISCLOSURE

Elastomeric materials are formed by contacting at least one dithiol with at least one polymercapto polyester polyether containing at least about three mercapto groups formed from the condensation of a polyhydroxy polyether and a mercapto hydrocarbon carboxylic acid under conditions sufficient to couple the mercapto groups of said dithiol and said polymercapto polyester polyether.

BACKGROUND OF THE INVENTION

This is a divisional application of our copending application having Ser. No. 610,491, filed Jan. 20, 1967.

This invention relates to polymercapto polyester polyethers. In one aspect, dimercapto compounds are crosslinked with polymercapto polyester polyethers by oxidative coupling. In another aspect, diester dithiols are crosslinked with polymercapto polyester polyethers containing at least about three ester and mercapto groups by oxidative coupling or curing.

It is known that radicals in molecules having mercapto functionality can be bonded to similar groups in other molecules, usually by oxidative coupling or curing. Because of this characteristic, polythiols have found application as sealants, coatings, calking compounds, and bonding compositions, etc. It is also known that numerous polythiols are expensive, inconvenient, and, as a result, undesirable in such applications. For example, dithiols can be oxidatively crosslinked by reacting them with hydrocarbon polythiols having at least three mercapto groups per molecule. The hydrocarbon polythiol generally used in such applications due to its availability is propane-1,2,3-trithiol which suffers the disadvantage of having an obnoxious odor.

It is an object of this invention to provide a method of crosslinking dimercapto compounds with polymercapto polyester polyethers by oxidative coupling or curing.

SUMMARY OF THE INVENTION

In accordance with one embodiment of this invention, polymercapto polyester polyethers containing at least about three mercapto groups are employed to form a crosslinked material by incorporation into a mixture with dimercapto compounds and an oxidative coupling or curing agent.

DESCRIPTION OF THE PREFERRED EMBODIMENTS

The polyhydroxy polyethers of this invention have at least three hydroxyl groups per molecule. Such polyhydroxy polyethers preferably have 3 to about 12 hydroxyl groups per molecule and molecular weights of from about 200 to about 20,000. These materials can be produced by the reaction of one or more epoxy-substituted hydrocarbons of the general formulas:

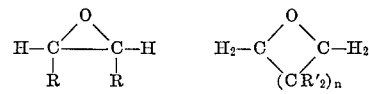

with a polyol of the general formula:

wherein either R can be H or alkyl with the total number of carbon atoms in the molecule being in the range of up to and including about 20; wherein R' can be alkyl or H with the total number of carbon atoms per molecule being in the range of up to and including about 20; and wherein $n$ can be an integer from 2 to about 5, preferably 2 to 3; and wherein Y can be a hydrocarbon moiety with 3 to 40 carbon atoms per moiety and a valence equal to the value of $x$, wherein $x$ is an integer from 3 to about 20, and wherein the number of carbon atoms per molecule of $Y(OH)_x$ is equal to or greater than $x$.

Polyols that are employed in the preparation of the polyhydroxy polyethers of this invention comprise hydrocarbons that are preferably saturated aliphatics, saturated cycloaliphatics, aryls, or combinations thereof that are substituted with at least three hydroxyl groups per molecule. In the presently preferred embodiment of this invention, these polyols, $Y(OH)_x$, can have up to about 12 hydroxyl groups per molecule, and can contain from 3 to about 20 carbon atoms per molecule. Illustrative of the polyols of this invention that can be represented by the general formula, $Y(OH)_x$, are glycerine, pentaerythritol, erythritol, 1,3,8-trihydroxycyclododecane, estriol, 1,4,5,8-naphthalenetetrol, di(p-hydroxyphenyl)phenyl methanol, and the like.

The polyhydroxy polyethers of this invention can be prepared by contacting a polyol of the formula $Y(OH)_x$, as defined above, with an epoxy-substituted hydrocarbon, as defined above, under suitable polymerization conditions, as is known to the art. For instance, glycerine can be contacted with a suitable excess of propylene oxide (1,2-epoxypropane) under elevated pressure and in the presence of suitable polymerization promoters. Products of this type can also be obtained from commercial sources. Niax Polyol LHT-67 (a trademark) is a commercial product of this type.

The presently preferred mercapto hydrocarbon carboxylic acids of this invention can be represented by the formula

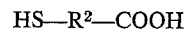

wherein $R^2$ is a bivalent radical such as alkylene, cycloalkylene, arylene, and combinations thereof having from one to about 20 carbon atoms per radical.

Illustrative examples of such mercapto hydrocarbon carboxylic acids are 3-mercaptopropionic acid, mercaptoacetic acid, 4-mercaptocyclohexane carboxylic acid, 8-mercaptooctadecanoic acid, p-mercaptobenzoic acid, 2-(p-mercaptophenyl)acetic acid, p-(3-mercapto-n-propyl)benzoic acid, 21-mercaptohenicosanoic acid, etc.

These acids may be polymercapto hydrocarbon carboxylic acids, although the hydrocarbon carboxylic acids having only one mercapto group per molecule are presently preferred. In addition, it is presently preferred that at least one mercapto group be situated on the terminal carbon atom when such mercapto group is situated on an aliphatic moiety, i.e., the omega position, although acids that are otherwise substituted can also be employed successfully. The presently most preferred mercapto hydrocarbon carboxylic acids are omega-mercapto alkanoic acids containing up to and including six carbon atoms.

The esterification reaction can be effected in any suitable equipment at temperatures preferably within the range of from about 50 to about 250° C., preferably about 80 to about 200° C. The reaction can be conducted in the presence or absence of diluents that are substantially inert to the reactants and products. Acid esterification catalysts, such as p-toluenesulfonic acid or benzenesulfonic acid, can also be employed if it is desired to accelerate the rate of reaction. In this event, the diluents employed should also be inert to these acid catalysts.

Examples of suitable diluents are, for example, toluene, benzene, xylene, cyclohexane, and the like.

Reaction pressure should be sufficient to prevent excessive loss of reactant materials at operating temperatures. Satisfactory pressures are usually within the range of from about 0.5 to about 10 atmospheres gauge pressure.

It is also usually desirable to provide means for removing water of reaction during the course of the esterification. This function can be accomplished by means known to the art such as continuously refluxing vapors over the liquid phase and collecting water in a water trap situated below the reflux condenser.

The esterification reaction must be effected to such an extent that more than two mercapto groups are introduced to each polyhydroxy polyether molecule on the average by such esterification. If monomercapto hydrocarbon carboxylic acids are employed, more than two ester linkages must be formed per molecule of polyhydroxy polyether on the average. On the other hand, if polymercapto hydrocarbon carboxylic acids are employed, more than two mercapto groups can be introduced into each polyhydroxy polyether molecule with less than two ester linkages being formed on the average. One skilled in the art can readily determine the degree of esterification that is most desirable for the particular result desired. Generally, we prefer to introduce at least about three mercapto groups per average polyhydroxy polyether molecule. Since we prefer to employ monomercapto hydrocarbon carboxylic acids, preferably at least about three ester linkages are introduced into each polyhydroxy polyether molecule on the average.

The polymercapto polyester polyethers produced in this manner can be used to effect the crosslinking of numerous other mercapto-containing polymers that cannot themselves be crosslinked in the absence of reactive materials having more than two functional groups per molecule.

Other compounds that can be crosslinked or coupled when blended with the polymercapto polyester polyethers of this invention include essentially any mercapto organic compound having two mercapto groups per molecule. Examples of such materials include organo dithiols, particularly dimercapto-terminated butadiene polymers, dimercapto-containing protein materials, dimercapto-containing polyamides and, more particularly, diesters of monomercapto hydrocarbon carboxylic acids (particularly mercaptoalkanoic acids), and the like. In a presently preferred embodiment, said diesters of monomercaptoalkanoic acids are employed. Suitable diester dithiols are described in copending application Ser. No. 590,478, now Pat. No. 3,475,389, as having the formula

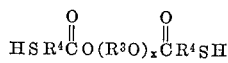

wherein $R^3$ is an alkylene radical having 2 to 4 carbon atoms; $R^4$ is a divalent hydrocarbon radical having 1 to about 20 carbon atoms and selected from the group consisting of alkylene, cycloalkylene, and arylene, and combinations thereof such as aralkylene, alkarylene, and the like; and $x$ is an integer of 1–100.

The diester dithiols utilized in the process of this invention are readily prepared by esterification of a mercapto acid having the formula

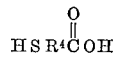

with a diol having the formula

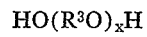

where $R^3$, $R^4$, and $x$ are as defined above. Conventional esterification techniques can be employed. Although larger or smaller ratios can be used, the mole ratio of mercapto acid to diol is preferably approximately 2:1. Preferably, an acid such as benzenesulfonic acid or p-toluenesulfonic acid is used to catalyze the esterification. If desired, a solvent, e.g., an aromatic hydrocarbon such as benzene, toluene, or xylene, or a saturated aliphatic or cycloaliphatic hydrocarbon such as hexane, octane, decane, cyclohexane, or methylcyclopentane, can be employed, in which instance water produced in the course of the reaction can be removed conveniently by azeotropic distillation.

The esterification can be carried out in an inert atmosphere, e.g., nitrogen, to inhibit by-product formation. Although other conditions of reaction temperature and time can be employed, the esterification is generally most advantageously carried out at temperatures of about 80° C. to about 200° C. for a period of time within the range of about 30 minutes to about 24 hours.

Examples of some mercapto acids which can be used in the esterification process include mercaptoacetic acid, 2-mercaptopropionic acid, 3-mercaptopropionic acid, 4-mercaptobutyric acid, 6-mercaptohexanoic acid, 2-mercapto-4-ethyloctanoic acid, 3-mercaptohexadecanoic acid, 2-mercaptoheneicosanoic acid, 4-mercaptocyclohexanecarboxylic acid, 2-methyl-3-mercaptocyclopentanecarboxylic acid, 2-mercapto-3-cyclohexylpropionic acid, 3-mercaptobenzoic acid, 4-mercapto-o-toluic acid, 4-mercaptophenylacetic acid, and mixtures thereof.

Examples of some diols which can be used in the esterification process include ethylene glycol, diethylene glycol, triethylene glycol, tetraethylene glycol, pentaethylene glycol, actaethylene glycol, eicosaethylene glycol, pentacontaethylene glycol, hectaethylene glycol, propylene glycol, dipropylene glycol, tripropylene glycol, tetrapropylene glycol, octapropylene glycol, triacontapropylene glycol, hectapropylene glycol, butylene glycol, dibutylene glycol, tributylene glycol, tetrabutylene glycol, decabutylene glycol, tetracontabutylene glycol, hectabutylene glycol, trimethylene glycol, ditrimethylene glycol, tritrimethylene glycol, tetratrimethylene glycol, dodecatrimethylene glycol, hexacontatrimethylene glycol, hectatrimethylene glycol, tetramethylene glycol, ditetramethylene glycol, tritetramethylene glycol, octatetramethylene glycol, eicosatetramethylene glycol, hectatetramethylene glycol, and mixtures thereof. It is to be understood, of course, that polyalkylene glycols containing two or more different alkylene radicals, e.g., an ethylene radical and a trimethylene radical, can be employed.

For reasons of handling and processibility, the molecular weight of the diester dithiols that are to be crosslinked is preferably within the range of from about 250 to about 30,000 and usually between about 1,000 and 20,000. It has been found that when the polymercapto polyester polyether having about three mercapto groups per molecule is employed, which is formed from the esterification of a polyhydroxy polyether with a mercaptoalkanoic acid, to crosslink a poly(oxyalkylene) diester of a monomercaptoalkanoic acid, that the molecular weight of the polyether should be from about 300 to about 5,000, preferably about 1,000 to about 5,000, and the molecular weight of the diester should be about 1,000 to about 4,000 in order to form a curable elastomeric product having desired mechanical properties of high extensibility with low stiffness; that is, only low stress being needed to deform the material. In general, about 1 to about 50 weight percent of said polyether is employed with about 99 to about 50 weight percent of said diester, preferably about 5 to about 20 weight percent of said polyether and about 95 to about 80 weight percent of said diester.

Although the inventive polymercapto polyester polyethers can be used to crosslink essentially any compound having at least two mercapto groups per molecule, their application is particularly useful for crosslinking compounds having only two mercapto groups per molecule which could not otherwise be oxidatively crosslinked.

The crosslinking or coupling of the polymercapto polyester polyethers in combination with dimercapto-containing compounds, as exemplified above, is preferably accomplished by procedures in the presence of oxidative coupling or curing agents such as lead dioxide, sulfur, peroxides, zinc oxide, and the like. It is generally desirable to dispense granular lead dioxide in an inert carrier such as dibutyl phthalate. Curing is generally effected at a temperature of from about 50 to about 160° F., preferably from about 60 to about 90° F.

The operability and value of this invention are clearly demonstrated by the following examples which are intended only to be illustrative of the concept of this invention and should not be construed to limit its application.

EXAMPLE I 300 grams of polyhydroxy polyether (propylene oxide reacted with 1,3,6-hexanetriol) having a molecular weight of 2,460, 63.6 grams of 3-mercaptopropionic acid, 600 cc. of toluene, and 6 grams of p-toluenesulfonic acid were charged to a reactor. The reactants were refluxed at atmospheric pressure for 5.75 hours. A water trap below the condenser was employed to remove water of reaction. The reactants were stirred mechanically during reflux and the reaction was conducted in an atmosphere of nitrogen. When reflux was terminated, the reactants were allowed to cool under a nitrogen purge, and the product was washed with 25 grams of sodium bicarbonate in 500 ml. of water in three portions. Excess water and toluene were added to break the resulting emulsion. The polymercapto polyester polyether product was then separated from the diluents under vacuum.

A mercapto-terminated polymer was then prepared as follows: 205 grams of a dihydroxy-terminated propylene oxide polymer having a molecular weight of 1005, 53 grams of 3-mercaptopropionic acid, 400 cc. of toluene, and 5 grams of p-toluenesulfonic acid were charged to a reactor. The production and purification of the diester dithiol were accomplished by the same procedure described in connection with the immediately preceding polymercapto polyester polyether polymer. The diester dithiol and the polymercapto polyester polyether polymer were then blended in several ratios as illustrated in the following table. To each of these mixtures was added a blend of 50 percent lead dioxide and 50 percent dibutyl phthalate in sufficient quantity to provide 10 percent excess lead dioxide over the stoichiometric amount required as determined by the concentration of mercapto groups present in the polymer blend. Curing or coupling was effected at a temperature of 135° F. for a period of 96 hours. Samples of each of these mixtures were then tested for Shore A hardness and tensile strength with the following results:

|  | Weight ratio [1] | Shore A hardness | Tensile strength, p.s.i. | Elongation, percent |
|---|---|---|---|---|
| Run 1 | 1 | 31 | 116 | 100 |
| Run 2 | 0.50 | 27 | 79 | 167 |
| Run 3 | 0.33 | 19 | 80 | 233 |
| Run 4 | 0.25 | 17 | 64 | 300 |
| Run 5 | 0.00 | ([2]) | ([2]) |  |

[1] Of polymercapto polyester polyether to diester dithiol.
[2] Soft gum-like material.

It is thus demonstrated that the crosslinking agents of this invention, the polymercapto polyester polyethers, effect crosslinking of dimercapto-terminated organic compounds and produce excellent elastomeric materials useful as sealants, calks, etc., upon cure.

We claim:

1. A method of forming elastomeric materials which comprises contacting at least one dimercapto organic compound selected from the group consisting of hydrocarbon dithiols, protein dithiols, dimercapto-substituted polyamides and poly(oxyalkylene) diesters of monomercapto hydrocarbon carboxylic acids with at least one polymercapto polyester polyether having at least about three mercapto groups per molecule produced by reacting a polyhydroxy polyether having at least three hydroxyl groups per molecule which is the reaction product of at least one epoxy hydrocarbon selected from the group consisting of

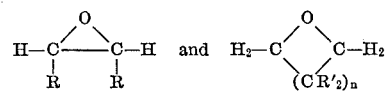

wherein either R is selected from the group consisting of hydrogen and alkyl radicals wherein each of such molecules have up to and including about 20 carbon atoms, R' is selected from the group consisting of hydrogen and alkyl radicals such that each of such molecules have up to and including about 20 carbon atoms, wherein $n$ is an integer of from 2 to about 5; and a polyol of the formula $$Y(OH)_x$$

wherein Y is selected from the group consisting of hydrocarbon radicals having from 3 to about 40 carbon atoms per radical and a valence equal to the value of $x$, and $x$ is an integer of from 3 to about 20 with a mercapto hydrocarbon carboxylic acid of the general formula

wherein $R^2$ is a bivalent saturated hydrocarbon radical having up to 20 carbon atoms in the presence of an acid esterification catalyst, under conditions of a temperature ranging from about 50° F. to about 160° F. and in the presence of an oxidative coupling agent capable of coupling —SH groups at temperatures in the range of 50–160° F. to crosslink the mercapto groups of said dimercapto organic compound and said polymercapto polyester polyether.

2. The method of claim 1 wherein said crosslinking is effected in the presence of an oxidative coupling promoter selected from the group consisting of lead dioxide, sulfur, peroxides and zinc oxide.

3. The crosslinked composition produced by the method of claim 1.

4. The method of claim 1 wherein said dimercapto organic compound is the condensate of a polyhydroxy polyether having the formula

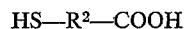

where $R^3$ is an alkylene having 2 to 4 carbon atoms and $x$ is an integer of 1–100 and a mercapto-substituted carboxylic acid having the formula

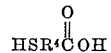

where $R^4$ is a divalent hydrocarbon radical having 1 to about 20 carbon atoms and is selected from the group consisting of alkylene, cycloalkylene, and arylene, and combinations thereof such as aralkylene, alkarylene, and the like in the presence of an acid esterification catalyst.

5. The method according to claim 4 wherein $R^3$ is propylene and R' is alkylene and wherein said dimercapto organic compound has a molecular weight of about 1000 to about 4000 and wherein said epoxy hydrocarbon is propylene oxide and said polymercapto polyester polyether has a molecular weight of about 1000 to about 5000.

6. The method of claim 5 wherein said dimercapto organic compound is present from about 99 to about 50 weight percent and said polymercapto polyester polyether is present in about 1 to about 50 weight percent.

References Cited
UNITED STATES PATENTS

| 3,254,061 | 5/1966 | Martin et al. | 260—79 |
| 3,278,496 | 10/1966 | Le Fave et al. | 260—79 |

DONALD E. CZAJA, Primary Examiner

M. I. MARQUIS, Assistant Examiner

U.S. Cl. X.R.

260—78, 79, 112, 823, 860